(12) United States Patent
Gao et al.

(10) Patent No.: US 12,344,412 B1
(45) Date of Patent: Jul. 1, 2025

(54) CLEANING SYSTEM AND METHOD SUITABLE FOR ULTRA-LARGE-SCALE PHOTOVOLTAIC POWER STATION

(71) Applicant: Inner Mongolia university of technology, Hohhot (CN)

(72) Inventors: Yunfeng Gao, Hohhot (CN); Hexi Baoyin, Hohhot (CN); Yang Yu, Hohhot (CN); Bin Cheng, Hohhot (CN); Wenxin Dai, Hohhot (CN); Yaze Liu, Hohhot (CN); Zhong Xue, Hohhot (CN); Lunhu Hu, Hohhot (CN)

(73) Assignee: Inner Mongolia university of technology, Hohhot (CN)

( * ) Notice: Subject to any disclaimer, the term of this patent is extended or adjusted under 35 U.S.C. 154(b) by 0 days.

(21) Appl. No.: 18/963,794

(22) Filed: Nov. 29, 2024

(30) Foreign Application Priority Data

Feb. 22, 2024 (CN) .......................... 202410196033.1

(51) Int. Cl.
*B64U 80/30* (2023.01)
*B64U 10/17* (2023.01)
(Continued)

(52) U.S. Cl.
CPC .............. *B64U 80/30* (2023.01); *B64U 10/17* (2023.01); *B64U 20/87* (2023.01); *H02S 40/10* (2014.12);
(Continued)

(58) Field of Classification Search
CPC ........ B64U 80/30; B64U 10/17; B64U 20/87; B64U 2101/29; B64U 2201/10; H02S 40/10; G01D 5/341; G02B 6/46
See application file for complete search history.

(56) References Cited

U.S. PATENT DOCUMENTS 9,447,448 B1 * 9/2016 Kozloski .................. B64D 1/22
10,860,115 B1 * 12/2020 Tran ...................... G08G 5/0052
(Continued)

FOREIGN PATENT DOCUMENTS

| CN | 112520037 A | 3/2021 |
|---|---|---|
| CN | 112764427 A | 5/2021 |
| CN | 115861855 A | 3/2023 |

OTHER PUBLICATIONS

Hou Zhiguo, et al., Research on Application of Automatic Cleaning System for PV Modules, Solar Energy, 2023, pp. 81-87, No. 11, Total No. 355.

(Continued)

*Primary Examiner* — Medhat Badawi
(74) *Attorney, Agent, or Firm* — Bayramoglu Law Offices LLC

(57) ABSTRACT

A cleaning system and a method suitable for an ultra-large-scale photovoltaic power station are provided; including a control terminal, an intelligent control center, and a large-load unmanned helicopter, the control terminal is provided with an operation interface to receive an instruction from an operator and transmit the instruction to the intelligent control center through a wireless communication, the intelligent control center is provided with a processor, a wireless communication module, a flight monitoring and control module, and a data feedback and optimization module; the present invention adopts the above system and method, the use of large-load unmanned helicopters is wide, which is more suitable for ultra-large-scale photovoltaic power stations, the high-pressure gas-liquid two-phase flow cleaning device is mounted on the large-load unmanned helicopter, which can carry out precise cleaning operations along the arrangement of photovoltaic panels, and spray high-pressure water and gas to remove dust and dirt.

1 Claim, 2 Drawing Sheets

(51) Int. Cl.
*B64U 20/87* (2023.01)
*H02S 40/10* (2014.01)
*B64U 101/29* (2023.01)

(52) U.S. Cl.
CPC ...... *B64U 2101/29* (2023.01); *B64U 2201/10* (2023.01)

(56) References Cited

U.S. PATENT DOCUMENTS

| | | | | |
|---|---|---|---|---|
| 11,235,890 | B1* | 2/2022 | Dahlstrom | B64D 1/18 |
| 12,182,336 | B2* | 12/2024 | Tran | G05D 1/46 |
| 12,202,594 | B2* | 1/2025 | Sinusas | B64D 31/06 |
| 12,202,633 | B2* | 1/2025 | Cai | B64U 50/19 |
| 12,202,634 | B1* | 1/2025 | England | B64D 47/02 |
| 12,204,032 | B2* | 1/2025 | Yang | G06V 20/176 |
| 12,204,235 | B2* | 1/2025 | Nielsen | G06F 9/3004 |
| 12,205,470 | B2* | 1/2025 | Pang | B64U 10/13 |
| 12,205,476 | B2* | 1/2025 | Schwindt | G08G 5/21 |
| 12,206,359 | B2* | 1/2025 | Jeong | B64U 10/00 |
| 12,206,990 | B2* | 1/2025 | Flanigan | B64U 20/87 |
| 2015/0293333 | A1* | 10/2015 | Li | G02B 13/14 359/356 |
| 2015/0293334 | A1* | 10/2015 | Li | G02B 7/10 359/683 |
| 2018/0050450 | A1* | 2/2018 | Parrott | G05D 1/695 |
| 2018/0107226 | A1* | 4/2018 | Yang | G05D 1/0676 |
| 2019/0068829 | A1* | 2/2019 | Van Schoyck | G08G 5/0021 |
| 2019/0068962 | A1* | 2/2019 | Van Schoyck | G06T 7/74 |
| 2019/0236732 | A1* | 8/2019 | Speasl | G05D 1/101 |
| 2019/0389577 | A1* | 12/2019 | Jones | G05D 1/0094 |
| 2020/0174129 | A1* | 6/2020 | Abdelkader | G05D 1/654 |
| 2021/0126582 | A1* | 4/2021 | Shue | G01M 5/005 |
| 2021/0271223 | A1* | 9/2021 | Feng | G06F 13/1663 |
| 2021/0408963 | A1* | 12/2021 | Dorsch | B08B 1/32 |
| 2022/0113423 | A1* | 4/2022 | Yang | G06V 20/176 |
| 2022/0169387 | A1* | 6/2022 | Van Der Steur | B05B 13/0452 |
| 2022/0247346 | A1* | 8/2022 | Dussault | B08B 3/024 |
| 2022/0247347 | A1* | 8/2022 | Gavrilov | G05D 1/0038 |
| 2022/0267002 | A1* | 8/2022 | Lee | B64U 10/13 |
| 2022/0380044 | A1* | 12/2022 | Arnold | B64U 20/30 |
| 2023/0091883 | A1* | 3/2023 | Kim | B64D 47/08 244/189 |
| 2023/0402964 | A1* | 12/2023 | Mohan | G16Y 40/35 |
| 2024/0001375 | A1* | 1/2024 | Henley | B03C 3/32 |
| 2024/0204717 | A1* | 6/2024 | Sagong | H02S 40/425 |
| 2024/0253819 | A1* | 8/2024 | Mathew | B64U 50/34 |
| 2024/0258960 | A1* | 8/2024 | Kim | H02S 30/10 |
| 2024/0286771 | A1* | 8/2024 | Lilleg-Staudenherz | B08B 7/02 |
| 2024/0317425 | A1* | 9/2024 | Bhaskara | B08B 1/34 |
| 2024/0389816 | A1* | 11/2024 | Li | A47L 1/02 |
| 2025/0003793 | A1* | 1/2025 | Oka | H04R 1/086 |
| 2025/0021101 | A1* | 1/2025 | Koch | G05D 1/101 |
| 2025/0021102 | A1* | 1/2025 | Koch | G05D 1/101 |
| 2025/0023511 | A1* | 1/2025 | Zhang | H02S 40/10 |

OTHER PUBLICATIONS

Xueyan Liu, Path Planning Study and Design of a Desert Photovoltaic Panel Cleaning Robot, 2021, pp. 67-68.

Satchidanand Kshetrimayum, et al., A Deep Learning Based Detection of Bird Droppings and Cleaning Method for Photovoltaic Solar Panels, 2023 IEEE International Conference on Systems, 2023, pp. 3398-3403.

* cited by examiner

CLEANING SYSTEM AND METHOD SUITABLE FOR ULTRA-LARGE-SCALE PHOTOVOLTAIC POWER STATION

CROSS REFERENCE TO THE RELATED APPLICATIONS

This application is based upon and claims priority to Chinese Patent Application No. 202410196033.1, filed on Feb. 22, 2024, the entire contents of which are incorporated herein by reference.

TECHNICAL FIELD

The present invention relates to the technical field of photovoltaic cleaning, in particular to a cleaning system and method suitable for an ultra-large-scale photovoltaic power station.

BACKGROUND

Solar energy is an important renewable energy source, which is of great significance for realizing the green transformation of energy structure and reducing environmental pollution. A large number of photovoltaic power stations have been built worldwide with the continuous development and application of solar energy technology, particularly in wild areas with complex terrain and changeable climate, such as deserts and Gobi beaches. The photovoltaic panels of these photovoltaic power stations are often covered by dust, dirt, etc., which affects the power generation efficiency and the service life of the panels. The conventional photovoltaic panel cleaning method relies on manual or basic mechanical devices, which not only have a low cleaning efficiency but also are difficult to operate under complex terrain and bad weather conditions. Although there have been unmanned aerial vehicle (UAV)-assisted cleaning technologies, these technologies still face problems such as complex operation, low cleaning efficiency, and high maintenance costs. Effective and efficient cleaning methods are particularly important in the large-scale photovoltaic power stations in the Gobi Desert, where existing technologies are unable to satisfy the requirements of such large-scale operations.

SUMMARY

An objective of the present invention is to provide a cleaning system and method suitable for an ultra-large-scale photovoltaic power station, and to solve the problems of complex operation, low cleaning efficiency, and high cleaning cost in cleaning large-scale photovoltaic panels by existing technology.

In order to achieve the above objective, the present invention provides a cleaning system suitable for an ultra-large-scale photovoltaic power station, including a control terminal, an intelligent control center, and a large-load unmanned helicopter, the control terminal is provided with an operation interface to receive an instruction from an operator and transmit the instruction to the intelligent control center through wireless communication, the intelligent control center is provided with a processor, a wireless communication module, a flight monitoring and control module, and a data feedback and optimization module;

the flight monitoring and control module is responsible for monitoring a flight status and fuel quantity of the large-load unmanned helicopter, the data feedback and optimization module collects performance data during an operation, including operation time and fuel consumption;

the intelligent control center is wirelessly connected to the large-load unmanned helicopter through the wireless communication module to control the large-load unmanned helicopter, the large-load unmanned helicopter is provided with a flight control system, a Global Positioning System (GPS), a camera, a fuel tank management system, and a high-pressure gas-liquid two-phase flow cleaning device.

Preferably, the flight control system includes an automatic flight control module, a route planning module, an image processing and analysis module, a cleaning execution module, and an obstacle avoidance sensor;

the automatic flight control module is responsible for a basic flight control of the large-load unmanned helicopter;

the route planning module is allowed to design a flight path of the large-load unmanned helicopter automatically according to an input specific layout and terrain conditions of photovoltaic power station;

the image processing and analysis module is responsible for processing images collected by the camera, and correcting a flight status of the large-load unmanned helicopter by using the image processing results;

the cleaning execution module is responsible for controlling cleaning parameters of the high-pressure gas-liquid two-phase flow cleaning device, including an injection pressure, an injection angle and continuous injection time;

the obstacle avoidance sensor is responsible for detecting a surrounding obstacle and prompting the large-load unmanned helicopter to avoid obstacles.

A cleaning method suitable for an ultra-large-scale photovoltaic power station, including the following steps:

S1: issuing a path planning instruction by the control terminal to carry out a cleaning route planning;

S2: issuing an intelligent cleaning instruction by the control terminal to clean a photovoltaic panel;

S3: after cleaning, according to data of the large-load unmanned helicopter, judging that the large-load unmanned helicopter moves to a next cleaning point, or returns to a supply station according to a planned route by the intelligent control center.

Preferably, in step S1, a specific process of cleaning route planning is as follows:

S11: controlling a take-off of the large-load unmanned helicopter after the intelligent control center receives the path planning instruction issued by the control terminal to obtain an aerial photograph of the photovoltaic power station, and obtaining a specific layout and terrain conditions of the photovoltaic power station, including a position, a size and an arrangement mode of the photovoltaic panel;

S12: generating an initial cleaning route by the route planning module using a pre-set algorithm according to the specific layout and terrain conditions of the photovoltaic power station;

S13: adjusting the initial cleaning route, avoiding buildings and trees, and determining a safe flying height;

S14: adjusting time and manner of cleaning by the route planning module using environmental factors, the environmental factors include weather conditions, light intensity and wind speed;

S15: using the adjusted initial cleaning route as a cleaning route.

Preferably, in step S2, a process of cleaning the photovoltaic panel is as follows:

S21: controlling a take-off of the large-load unmanned helicopter after the intelligent control center receives the intelligent cleaning instruction issued by the control terminal, and flying according to the cleaning route by means of the automatic flight control module, during a flight process, acquiring an image by the camera, and adjusting the cleaning route by the image processing and analysis module based on the acquired image and combined with the obstacle avoidance sensor;

S22: in the flight process, monitoring a flight status of the large-load unmanned helicopter continuously by the flight monitoring and control module, wherein the flight status includes speed, altitude, direction and fuel quantity;

S23: during the flight process, performing a jet cleaning on the photovoltaic panel by the cleaning execution module controlling the high-pressure gas-liquid two-phase flow cleaning device;

S24: during the cleaning process, monitoring the flight status and fuel quantity of the large-load unmanned helicopter in real-time by the intelligent control center through the flight monitoring and control module, and collecting cleaning time and a fuel consumption measurement by using the data feedback and optimization module;

S25: completing the cleaning when the large-load unmanned helicopter has completed the cleaning route.

Therefore, the present invention adopts a cleaning system and method suitable for an ultra-large-scale photovoltaic power station mentioned in the above method, which has the following advantages:

(1) In the present invention, the operation is more convenient, the operator can issue a simple instruction to achieve full automation of photovoltaic panel cleaning operation and maintenance work by the control terminal and combined with the real-time data of the power station. This method is not only convenient and quick, but also ensures the timeliness and efficiency of photovoltaic panel cleaning.

(2) In the present invention, the intelligent control center is provided with a flight monitoring and control module to monitor the working status of the large-load unmanned helicopter in real-time throughout the whole process to ensure the smooth and safe execution of the cleaning operation.

(3) In the present invention, efficient unmanned cleaning and operation and maintenance can be realized in photovoltaic power stations with complex terrain. This not only reduces the operation and maintenance costs, but also improves the overall operational efficiency.

(4) In the present invention, the route planning module can automatically plan the cleaning route, and the cleaning execution module adjusts the cleaning strategy according to the real-time data, so the human resources are saved and the operation and maintenance efficiency are greatly improved without tedious manual operation.

(5) In the present invention, the large-load unmanned helicopter will automatically perform a position detection through the positioning system before starting the operation, ensuring that the cleaning task is performed along the cleaning route, the automatic cleaning operation reduces the risk of human error and ensures the accuracy of the operation and the safety of the machine.

Further detailed descriptions of the technical scheme of the present invention can be found in the accompanying drawings and embodiments.

DETAILED DESCRIPTION OF THE EMBODIMENTS

In order to make the objectives, the technical solutions, and the advantages of the present disclosure clearer, the following clearly and completely describes the technical solutions in embodiments of the present disclosure with reference to the embodiments of the present disclosure. Apparently, the described embodiments are only some but not all of the embodiments of the present disclosure. The components of the embodiment of the present invention, which are usually described and displayed in the attached figure here, can be arranged and designed in various configurations. The specific model specifications need to be determined according to the actual specifications of the device. The specific selection calculation method adopts the existing technology in this field, so it is no longer described in detail.

Embodiment

Figure 1:
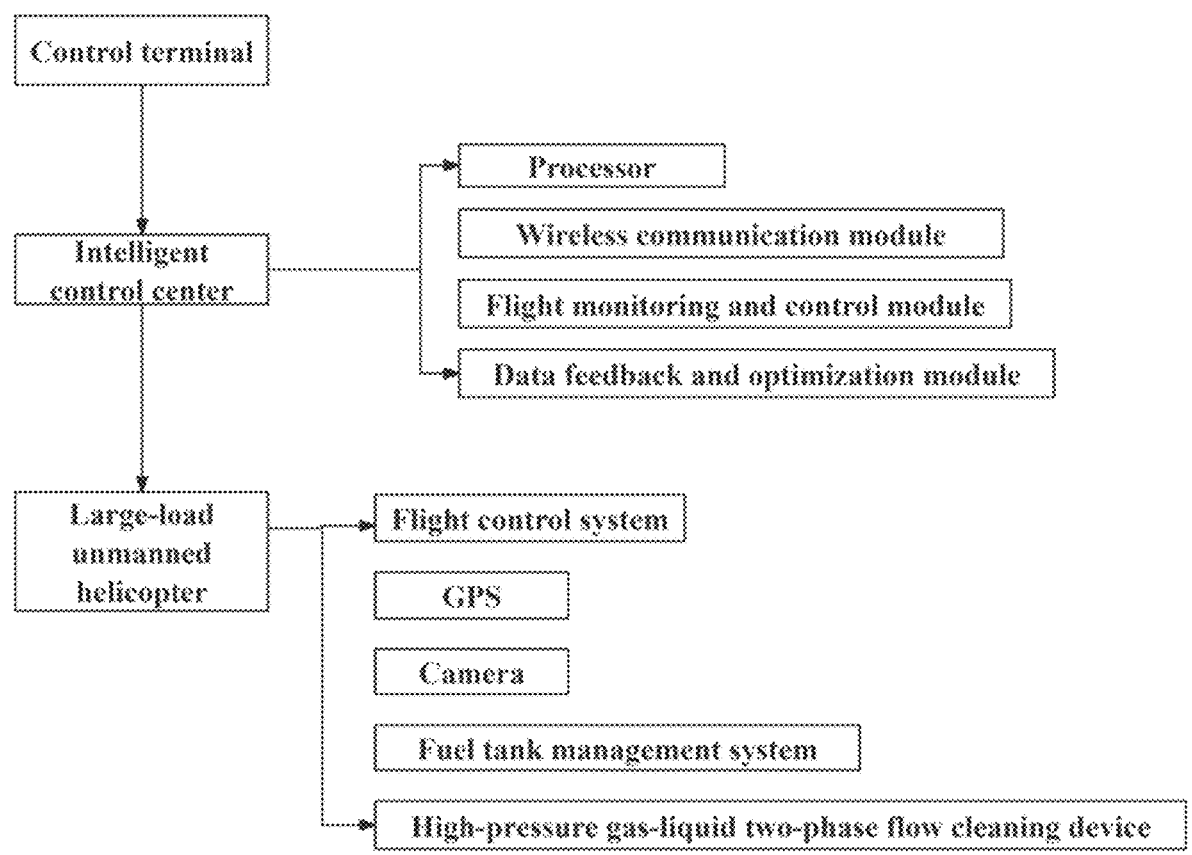
FIG. 1 is a system structure diagram of a cleaning system suitable for an ultra-large-scale photovoltaic power station in the present invention.

As shown in FIG. 1, the present invention provides a cleaning system suitable for an ultra-large-scale photovoltaic power station, including a control terminal, an intelligent control center, and a large-load unmanned helicopter, the control terminal is provided with an operation interface to receive an instruction from an operator and transmit the instruction to the intelligent control center through a wireless communication, the intelligent control center is provided with a processor, a wireless communication module, a flight monitoring and control module, and a data feedback and optimization module; the intelligent control center is responsible for receiving instructions from the control terminal and controlling the operation of the large-load unmanned helicopter based on these instructions;

the flight monitoring and control module combines sensor data and a flight control algorithm to monitor the flight status, fuel quantity and operating environment of large-load unmanned helicopters to ensure the safety and stability of flight;

the data feedback and optimization module collects performance data during the operation, including operating time and fuel consumption, the performance data is used to optimize subsequent cleaning plans and strategies, and to provide necessary maintenance and service tips;

the intelligent control center is wirelessly connected to the large-load unmanned helicopter through the wireless communication module to control large-load unmanned helicopter, the large-load unmanned helicopter is provided with a flight control system, a GPS, a camera, a fuel tank management system, and a high-pressure gas-liquid two-phase flow cleaning device;

the fuel tank management system is used to monitor and manage the fuel tank status of large-load unmanned helicopters to ensure long-term stable operation;

the flight control system includes an automatic flight control module, a route planning module, an image processing and analysis module, a cleaning execution module, and an obstacle avoidance sensor;

the automatic flight control module is responsible for a basic flight control of the large-load unmanned helicopter;

the route planning module is allowed to design a flight path of the large-load unmanned helicopter automatically according to an input specific layout and terrain conditions of photovoltaic power station;

the image processing and analysis module is responsible for processing images collected by the camera, and a flight status of the large-load unmanned helicopter is corrected by using the image processing results, which is more suitable for the actual arrangement of the photovoltaic panels;

the cleaning execution module is responsible for controlling cleaning parameters of the high-pressure gas-liquid two-phase flow cleaning device, including an injection pressure, an injection angle and continuous injection time, in order to achieve the most effective cleaning effect;

the obstacle avoidance sensor is responsible for detecting a surrounding obstacle and prompting the large-load unmanned helicopter to avoid obstacles.

Figure 2:
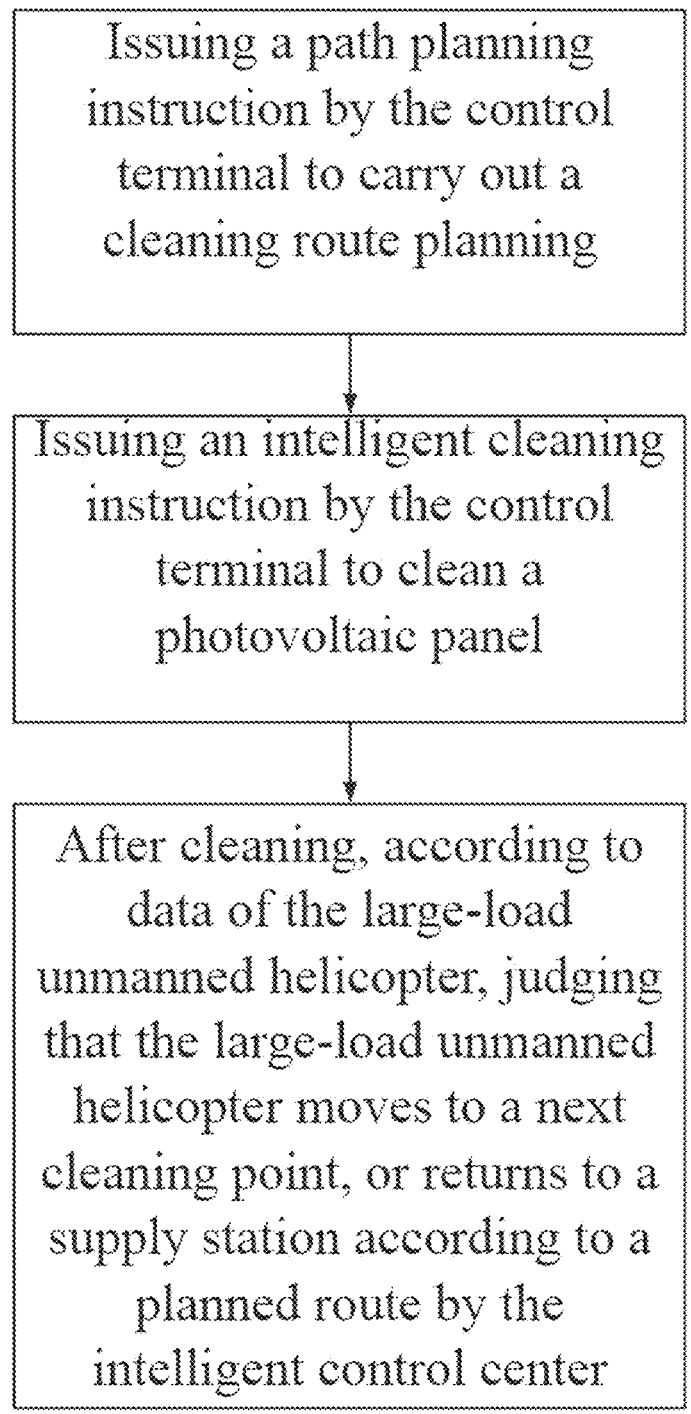
FIG. 2 is a flow chart of a cleaning method suitable for an ultra-large-scale photovoltaic power station in the present invention.

As shown in FIG. 2, a cleaning method suitable for an ultra-large-scale photovoltaic power station, including the following steps:

S1: a path planning instruction is issued by the control terminal to carry out a cleaning route planning;

a specific process of the cleaning route planning is as follows:

S11: a take-off of the large-load unmanned helicopter is controlled after the intelligent control center receives the path planning instruction issued by the control terminal to obtain an aerial photograph of the photovoltaic power station, and a specific layout and terrain conditions of the photovoltaic power station are obtained, including a position, a size and an arrangement mode of the photovoltaic panel;

S12: an initial cleaning route is generated by the route planning module using a pre-set algorithm according to the specific layout and terrain conditions of the photovoltaic power station, the algorithm considers an optimal coverage area and a shortest path to ensure the cleaning efficiency;

S13: the initial cleaning route is adjusted, buildings and trees are avoided, and a safe flying height is determined to ensure the safety and accessibility of the large-load unmanned helicopter when performing cleaning tasks;

S14: time and manner of cleaning are adjusted by the route planning module using environmental factors, the environmental factors include weather conditions, light intensity and wind speed, and ensured cleaning effect and operation safety;

S15: the adjusted initial cleaning route is used as a cleaning route.

S2: an intelligent cleaning instruction is issued by the control terminal to clean a photovoltaic panel;

a process of the cleaning the photovoltaic panel is as follows:

S21: a take-off of the large-load unmanned helicopter is controlled after the intelligent control center receives the intelligent cleaning instruction issued by the control terminal, and flown according to the cleaning route by means of the automatic flight control module, during a flight process, an image is acquired by the camera, and the cleaning route is adjusted by the image processing and analysis module based on the acquired image and combined with the obstacle avoidance sensor;

S22: in the flight process, a flight status of the large-load unmanned helicopter is monitored continuously by the flight monitoring and control module, wherein the flight status includes speed, altitude, direction and fuel quantity, to ensure safe flight according to the scheduled route;

S23: during the flight process, a jet cleaning is performed on the photovoltaic panel by the cleaning execution module controlling the high-pressure gas-liquid two-phase flow cleaning device according to the preset parameters;

S24: during the cleaning process, the flight status and fuel quantity of the large-load unmanned helicopter are monitored in real-time by the intelligent control center through the flight monitoring and control module, and cleaning time and a fuel consumption measurement are collected by using the data feedback and optimization module;

S25: cleaning is completed when the large-load unmanned helicopter has completed the cleaning route.

S3: After cleaning, according to data of the large-load unmanned helicopter, judged that the large-load unmanned helicopter moves to a next cleaning point, or returns to a supply station according to a planned route by the intelligent control center.

In a specific operation, after the control terminal sends out the path planning instruction, the intelligent control center starts the large-load unmanned helicopter and automatically plans the cleaning route according to the specific layout of the photovoltaic power station. The route planning takes into account the terrain, the distribution of photovoltaic panels and other environmental factors, after obtaining the cleaning route, the control terminal issues an intelligent cleaning instruction, and the large-load unmanned helicopter flies along the cleaning route, meanwhile, the high-pressure gas-liquid two-phase flow cleaning device starts to perform the cleaning operation according to the cleaning execution module.

During the cleaning process, the intelligent control center monitors the flight status of the large-load unmanned helicopter and the operation of the cleaning device in real-time to ensure the safety and effectiveness of the operation; after the cleaning operation is completed, the large-load unmanned helicopter will automatically return to the supply station for fuel replenishment and necessary maintenance work, during the entire cleaning process, the control terminal can receive operating data and images in real-time, and allow the operator to monitor the progress and quality of the operation.

Therefore, the present invention adopts a cleaning system and method suitable for an ultra-large-scale photovoltaic power station, wherein the cleaning task can be completed efficiently and safely under various environmental conditions by using a large-load unmanned helicopter with the help of a series of highly intelligent and coordinated steps, and the cleaning effect and the efficiency of the overall operation are improved to the greatest extent.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A cleaning system suitable for an ultra-large-scale photovoltaic power station, comprising a control terminal, an intelligent control center, and a large-load unmanned helicopter, wherein the control terminal is provided with an operation interface to receive an instruction from an operator and transmit the instruction to the intelligent control center through a wireless communication, and the intelligent control center is provided with a processor, a wireless communication module, a flight monitoring and control module, and a data feedback and optimization module;

the flight monitoring and control module is responsible for monitoring a flight status and a fuel quantity of the large-load unmanned helicopter, and the data feedback and optimization module collects performance data during an operation, wherein the performance data comprises operation time and fuel consumption;

the intelligent control center is wirelessly connected to the large-load unmanned helicopter through the wireless communication module to control the large-load unmanned helicopter, and the large-load unmanned helicopter is provided with a flight control system, a Global Positioning System (GPS), a camera, a fuel tank management system, and a high-pressure gas-liquid two-phase flow cleaning device;

the flight control system comprises an automatic flight control module, a route planning module, an image processing and analysis module, a cleaning execution module, and an obstacle avoidance sensor;

the automatic flight control module is responsible for a basic flight control of the large-load unmanned helicopter;

the route planning module is allowed to design a flight path of the large-load unmanned helicopter automatically according to an input specific layout and terrain conditions of the ultra-large-scale photovoltaic power station;

the image processing and analysis module is responsible for processing an image collected by the camera, and correcting the flight status of the large-load unmanned helicopter by using image processing results;

the cleaning execution module is responsible for controlling cleaning parameters of the high-pressure gas-liquid two-phase flow cleaning device, wherein the cleaning parameters comprise an injection pressure, an injection angle, and continuous injection time;

the obstacle avoidance sensor is responsible for detecting a surrounding obstacle and prompting the large-load unmanned helicopter to avoid obstacles; and a cleaning method for the cleaning system suitable for the ultra-large-scale photovoltaic power station, comprising the following steps:

S1: issuing a path planning instruction by the control terminal to carry out a cleaning route planning;

S11: controlling a first take-off of the large-load unmanned helicopter after the intelligent control center receives the path planning instruction issued by the control terminal to obtain an aerial photograph of the ultra-large-scale photovoltaic power station, and obtaining a specific layout and the terrain conditions of the ultra-large-scale photovoltaic power station, wherein the specific layout and the terrain conditions of the ultra-large-scale photovoltaic power station comprise a position, a size, and an arrangement mode of a photovoltaic panel;

S12: generating an initial cleaning route by the route planning module using a pre-set algorithm according to the specific layout and the terrain conditions of the ultra-large-scale photovoltaic power station;

S13: adjusting the initial cleaning route, avoiding buildings and trees, and determining a safe flying height;

S14: adjusting time and manner of a cleaning by the route planning module using environmental factors, wherein the environmental factors comprise weather conditions, light intensity, and wind speed; and S15: using an adjusted initial cleaning route as a cleaning route;

S2: issuing an intelligent cleaning instruction by the control terminal to clean the photovoltaic panel;

S21: controlling a second take-off of the large-load unmanned helicopter after the intelligent control center receives the intelligent cleaning instruction issued by the control terminal, and flying according to the cleaning route by the automatic flight control module, during a flight process, acquiring the image by the camera, and adjusting the cleaning route by the image processing and analysis module based on the image and combined with the obstacle avoidance sensor;

S22: in the flight process, monitoring the flight status of the large-load unmanned helicopter continuously by the flight monitoring and control module, wherein the flight status comprises speed, altitude, direction, and the fuel quantity;

S23: during the flight process, performing a jet cleaning on the photovoltaic panel by the cleaning execution module controlling the high-pressure gas-liquid two-phase flow cleaning device;

S24: during a cleaning process, monitoring the flight status and the fuel quantity of the large-load unmanned helicopter in real-time by the intelligent control center through the flight monitoring and control module, and collecting cleaning time and a fuel consumption measurement by using the data feedback and optimization module; and S25: completing the cleaning when the large-load unmanned helicopter has completed the cleaning route; and S3: after the cleaning, according to data of the large-load unmanned helicopter, judging that the large-load unmanned helicopter moves to a next cleaning point, or returns to a supply station according to a planned route by the intelligent control center.

* * * * *